United States Patent [19]

Sato et al.

[11] Patent Number: 5,191,486
[45] Date of Patent: Mar. 2, 1993

[54] CFRP-MADE OPTICAL CYLINDER

[75] Inventors: Kunihiko Sato; Kazuo Morohashi; Hidetoshi Takahashi, all of Yokohama, Japan

[73] Assignee: Nippon Oil Co., Ltd., Tokyo, Japan

[21] Appl. No.: 860,323

[22] Filed: Mar. 30, 1992

[30] Foreign Application Priority Data

Mar. 30, 1991 [JP] Japan .................. 3-91017

[51] Int. Cl.$^5$ .............................. G02B 5/00
[52] U.S. Cl. ................... 359/894; 156/184; 156/187; 138/125; 138/177; 419/24
[58] Field of Search ........... 359/894, 399; 156/171, 156/184, 187; 138/125, 132, 177; 419/23, 24; 524/495, 496; 52/309.1; 60/595

[56] References Cited

U.S. PATENT DOCUMENTS

| | | |
|---|---|---|
| 4,601,928 | 7/1986 | van der Velden ............... 138/125 |
| 4,702,885 | 10/1987 | Odani et al. ..................... 419/23 |
| 4,707,206 | 11/1987 | Trepus, Jr. et al. ............. 138/125 |
| 4,950,064 | 8/1990 | Akin, Jr. ........................ 359/894 |
| 5,038,834 | 8/1991 | Siegfried ....................... 138/177 |
| 5,052,444 | 10/1991 | Messerly et al. ................ 138/132 |

Primary Examiner—Loha Ben
Attorney, Agent, or Firm—Cushman, Darby & Cushman

[57] ABSTRACT

The present invention provides a CFRP-made optical cylinder comprising (a) CFRP layers containing a carbon fiber arranged in a direction substantially parallel to the cylinder axial direction and (b) CFRP layers containing a carbon fiber arranged in a direction nearly orthogonal to the cylinder axial direction, in which cylinder the carbon fiber arranged in a direction substantially parallel to the cylinder axial direction has a minus thermal expansion coefficient and the cylinder axial direction has a thermal expansion coefficient of $-0.5 \times 10^{-6}/°C$. to $0.5 \times 10^{-6}/°C$. In the present optical cylinder, a sharp image can be maintained without making the correction of the optical axis even when the atmospheric temperature changes largely.

16 Claims, 1 Drawing Sheet

CFRP-MADE OPTICAL CYLINDER

BACKGROUND OF THE INVENTION a) Field of the Invention

The present invention relates to a CFRP (carbon fiber-reinforced plastic)-made optical cylinder used typically in astronomical telescopes, etc.

b) Description of the Related Art

Cylindrical articles used in industries and various devices or apparatuses are produced generally using various metallic materials or organic materials (e.g. resins). The requirements for these cylindrical articles depend upon their applications, and are extremely high in some cases. With respect to the optical cylinder intended by the present invention, no fully satisfactory material has been found because of the requirements.

In optical cylinders, for example, cylinders of astronomical telescopes, since the astronomical observation often lasts as long as several hours even when an ordinary type telescope is used, the deviation of an image from the focal length set in advance, due to the change in atmospheric temperature during the observation is as large as about 0.1 mm in the case of an iron-made cylinder of 1 m in length when the atmospheric temperature changes by 10°C. Thus, when the telescope cylinder is made of iron having a thermal expansion coefficient $\alpha$ of $10 \times 10^{-6}/°C$., the deviation is as mentioned above, and when the telescope cylinder is made of aluminum having an $\alpha$ of $24 \times 10^{-6}/°C$., the deviation is as large as 0.24 mm.

The change in atmospheric temperature during the observation gives rise to air layers of different specific gravities in the cylinder when the cylinder is made of a metal material of high thermal conductivity, which produces a convection therein and consequently gives a distorted image. Incidentally, the thermal conductivity of iron is 50 w/mk and that of aluminum is 237 w/mk. The formation of air layers of different specific gravities is influenced not only by the thermal conductivity of the cylinder material but also by its specific heat. Incidentally, the specific heat of iron is 3.6 J/cm$^3$.°C.

In the cylinders made of materials having the above-mentioned levels of the thermal expansion coefficient, thermal conductivity, specific heat, etc., the frequent correction of the optical axis is required, making it difficult to maintain a sharp image during the observation time.

Also in the cylinders made of conventional materials, since the specific modulus of each material is small, the cylinder weight is large in order to have desired rigidity, making the balance weight large and requiring a tripod, etc. made of a material of high rigidity. Incidentally, the specific modulus which is a quotient obtained by dividing modulus by specific gravity is $2.7 \times 10^9$ mm$^2$ in the case of iron and $5.4 \times 10^9$ mm$^2$ in the case of aluminum.

OBJECT AND SUMMARY OF THE INVENTION

In view of the above-mentioned situation of the prior art, the object of the present invention is to provide an optical cylinder which is not affected by the change in atmospheric temperature, which requires no frequent correction of optical axis, which always gives a sharp image, and which is lightweight. The present inventors found that the object can be achieved by using a CFRP whose carbon fiber has a particular thermal expansion coefficient and whose thermal expansion coefficient in the axial direction of the cylinder to be produced is controlled in a particular range. The finding has led to the completion of the present invention.

The present invention relates to a CFRP-made optical cylinder comprising (a) CFRP layers containing a carbon fiber arranged in a direction substantially parallel to the cylinder axial direction and (b) CFRP layers containing a carbon fiber arranged in a direction nearly orthogonal to the cylinder axial direction, in which cylinder the carbon fiber arranged in a direction substantially parallel to the cylinder axial direction has a minus thermal expansion coefficient and the cylinder axial direction has a thermal expansion coefficient of $-0.5 \times 10^{-6}/°C$. to $0.5 \times 10^{-6}/°C$.

BRIEF DESCRIPTION OF THE DRAWINGS

In FIG. 1, 1 refers to a CFRP layer containing a carbon fiber arranged in a direction orthogonal to the cylinder axial direction; and 2 refers to a CFRP layer containing a carbon fiber arranged in a direction parallel to the cylinder axial direction.

DETAILED DESCRIPTION OF THE INVENTION

Figure 1:
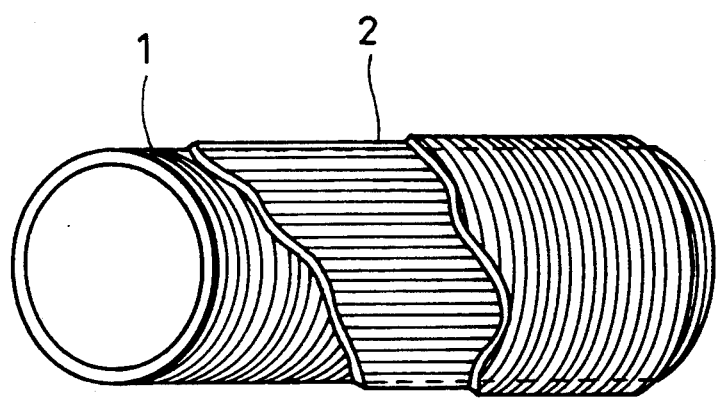
FIG. 1 is a drawing showing an example of the optical cylinder of the present invention, wherein CFRP layers containing carbon fibers arranged in different directions are laminated.

Carbon fibers are generally obtained by using, as the material fiber, an organic fiber [e.g. a synthetic acrylic fiber (PAN) or a cellulose fiber], a pitch fiber (obtained by melt-spinning a petroleum pitch or a carbon pitch) or the like and subjecting the material fiber to an infusibilization treatment in an oxidizing atmosphere (e.g. air) ordinarily at 200°–400° C. to obtain an infusibilized fiber and heating the infusibilized fiber in an inert atmosphere at 800°–3,000° C.

These carbon fibers have fiber diameters of generally 15 $\mu$m or less, preferably 7–13 $\mu$m, and can be used in the form of strand generally consisting of, for example, 2,000–3,000 fibers.

In the present invention, the carbon fiber arranged in a direction substantially parallel to the cylinder axial direction must have a minus thermal expansion coefficient in the fiber axial direction. The type of said carbon fiber is not particularly restricted as long as the carbon fiber has a minus thermal expansion coefficient, but a carbon fiber obtained from a pitch fiber is particularly preferable. The strength and modulus of said carbon fiber are not particularly restricted, either, but a carbon fiber having a high modulus, for example, 40 ton/mm$^2$ or more, preferably 50 ton/mm$^2$ or more is particularly preferable.

Meanwhile, the carbon fiber arranged in a direction nearly orthogonal to the cylinder axial direction or in the cylinder circumferential direction has no restriction as mentioned above. However, as this carbon fiber, there can generally be used the same carbon fiber as that arranged in a direction parallel to the cylinder axial direction.

The resin constituting the CFRP used in the present invention can be a thermosetting resin selected from a phenolic resin, a urea resin, a melamine resin, an unsaturated polyester resin, an epoxy resin, etc. Of these, an epoxy resin is preferable.

The CFRP-made optical cylinder of the present invention can be produced by impregnating the above-mentioned carbon fiber with the above-mentioned thermosetting resin in a proportion suited for the object of the present invention, shaping the impregnated fiber into a cylindrical form, and curing the cylindrical form.

The CFRP-made optical cylinder of the present invention can be produced by various methods. The methods include a method using prepreg(s), a method by filament winding, a method combining them appropriately, etc.

The method using prepreg(s) is generally conducted by impregnating a carbon fiber bundle with a thermosetting resin composition (e.g. an epoxy resin composition) to prepare a prepreg, cutting the prepreg in an appropriate direction, winding the cut prepreg round a cylindrical mold in a plurality of layers, as necessary applying a tape thereon, and heating the prepreg layers under an applied pressure.

The method by filament winding is generally conducted by impregnating a carbon fiber bundle with an epoxy resin composition to prepare a strand, winding the strand round a mandrel in a plurality of layers to prepare a cylinder of given thickness on the mandrel, and heat-curing the cylinder.

The method using prepreg(s) can be simply conducted by laminating two prepregs formed by impregnating a carbon fiber bundle with an epoxy resin composition, in such a manner that the directions of the respective fibers are orthogonal to each other, and then rolling the laminate into a cylindrical form so that the carbon fiber having a minus thermal expansion coefficient is substantially parallel to the axial direction of the cylinder formed by the rolling. This practice can produce a cylinder in which the CFRP layers containing a carbon fiber arranged in the cylinder axial direction and the CFRP layers containing a carbon fiber arranged in the cylinder circumferential direction are laminated alternately.

The method using prepreg(s) can also be conducted by laminating, in a plurality of layers, prepregs whose carbon fiber is arranged in the cylinder axial direction and then laminating thereon prepreg(s) whose carbon fiber is arranged in the cylinder circumferential direction, or reversing the above procedure, or combining these procedures appropriately.

The proportion (volume ratio) of the carbon fiber and the thermosetting resin is 75/25 to 50/50, preferably 60/40 to 50/50. Preferably, the carbon fiber is nearly in the closest packing, but its maximum proportion is 75-70%.

The prepregs used in the present invention can each have a thickness of generally 0.05-0.3 mm, preferably 0.1-0.2 mm.

The prepregs are laminated in an appropriate thickness in order to satisfy the strength required by the cylinder to be produced. For example, a film having a thickness of 0.12 mm can be laminated in 10-20 layers to obtain a laminate having a thickness of 1.2-2.4 mm.

In the production of the CFRP-made optical cylinder of the present invention, it is important to conduct lamination so that the volume ratio of the CFRP layers having a carbon fiber direction parallel to the cylinder axial direction and the CFRP layers having a carbon fiber direction orthogonal to the cylinder axial direction becomes 55/45 to 65/35, preferably 57/43 to 63/37. When the proportion of the CFRP layers having a carbon fiber direction parallel to the cylinder axial direction is less than 55 by volume, the resulting cylinder has a large thermal expansion coefficient and the object of the present invention is difficult to achieve. When the proportion is more than 65 by weight, the cylinder has no sufficient mechanical properties, in particular no sufficient compression strength and cannot be put in practical application.

According to the finding by the present inventors, a special lamination method must be adopted because each CFRP layer has significantly different thermal expansion coefficients in the fiber axial direction and a direction orthogonal thereto. This is explained with reference to FIG. 1. When a carbon fiber having a minus thermal expansion coefficient is used, the CFRP layer shown by 1 of FIG. 1 has a thermal expansion coefficient $\alpha$ of $30 \times 10^{-6}/°C$. to $40 \times 10^{-6}/°C$. in a direction orthogonal to the carbon fiber direction, and the CFRP layer shown by 2 has a thermal expansion coefficient $\alpha$ of about $-1 \times 10^{-6}/°C$. in the carbon fiber direction.

The thermal expansion coefficient of each CFRP layer is largely influenced also by the type of the carbon fiber used and its proportion to the matrix resin. However, in order to achieve the object of the present invention, it is preferable to increase the proportion of carbon fiber to resin as long as the bending rigidity, compression strength, modulus, etc. of the cylinder to be produced are not impaired.

As long as the thermal expansion coefficient of the CFRP layers arranged in the cylinder axial direction is within the range specified by the present invention, the cylinder of the present invention can contain CFRP layer(s) containing a carbon fiber arranged in a direction other than the direction parallel or orthogonal to the cylinder axial direction.

The CFRP-made optical cylinder of the present invention is also characterized by having a thermal conductivity of 0.1 w/m·k or less in the cylinder thickness direction. That is, the present optical cylinder has a thermal conductivity in the thickness direction which is one several thousandsth of that of iron or aluminum (conventional material); accordingly, there appear no air layers of different specific gravities in the cylinder and no convection is generated, and consequently a sharp image can be maintained.

In the CFRP-made optical cylinder of the present invention, a sharp image can be maintained without making the correction of the optical axis even when the atmospheric temperature changes largely. Further in the optical cylinder, since the thermal conductivity can be made as small as one several thousandsth of the case using iron or aluminum, there appear no air layers of different specific gravities and consequently no convection is generated, enabling the maintenance of a sharp image. Furthermore, the present optical cylinder, using a material having a larger specific modulus than conventional materials, can allow the entire apparatus to have a significantly reduced weight.

The present invention is hereinafter described specifically by way of Examples and Comparative Examples. However, the present invention is by no means restricted to these Examples. In the followings, bending modulus and bending rigidity were measured in accordance with JIS K 6911, JIS K 7203 and ASTM D 790.

EXAMPLES 1-2

A roving consisting of $2,000 \times 5$ pitch-based carbon fibers (diameter: 10 μm, tensile modulus: 500 GPa, tensile strength: 400 MPa, tensile elongation: 0.3%, thermal expansion coefficient: $-0.9$ to $-1.2$, volume resistivity: $0.5 \times 10^{-3}$ to $0.8 \times 10^{-3}$ Ω·cm) was impregnated, under tension, with an epoxy resin [Epicoat 828 (trade name) manufactured by Yuka Shell Epoxy K.K.] at a volume ratio of 60 (carbon fiber): 40 (epoxy resin), to produce a carbon fiber-containing film of 120 μm in thickness in which the carbon fibers are arranged in the same direction.

The above film was laminated in a plurality of layers so that the carbon fiber direction of one layer became orthogonal to that of other layer, to prepare a laminate in which the volume ratio of the film layers having a carbon fiber direction parallel to the axial direction of the cylinder to be produced was 50. The laminate was wound round a cylindrical mold in a thickness of 2 mm and then heat-cured.

The thus produced cylinder had an outer diameter of 324.0 mm, an inside diameter of 320.8 mm. This was used as a cylinder of an astronomical telescope having a total length of 820 mm.

Then, the cylinder was measured for modulus and bending rigidity each in axial direction and circumferential direction and further for thermal expansion coefficient, thermal deformation, thermal conductivity and specific heat. The results are shown in Table 1 as the typical mechanical and thermal properties of the CFRP-made cylinder of the present invention.

In Example 2, the volume ratio of the film layers having a carbon fiber direction parallel to the axial direction of the cylinder to be produced was 60. The results are also shown in Table 1.

COMPARATIVE EXAMPLES 1-2

Cylinders having the dimensions shown in Table 1 were produced using conventional materials, i.e. iron and aluminum. They were measured for weight, mechanical properties in axial direction and circumferential direction, and thermal properties. The results are shown in Table 1. The cylinder made of iron had a thickness of 1.6 mm.

COMPARATIVE EXAMPLE 3

A cylinder was produced in the same manner as in Example 1 except that the volume ratio of the CFRP having a carbon fiber direction parallel to the cylinder axial direction and the CFRP having a carbon fiber direction orthogonal to the cylinder axial direction was 40:60. The results of measurements are shown in Table 1.

direction substantially parallel to the cylinder axial direction and (b) CFRP layers containing a carbon fiber arranged in a direction nearly orthogonal to the cylinder axial direction, in which cylinder the carbon fiber arranged in a direction substantially parallel to the cylinder axial direction has a minus thermal expansion coefficient and the cylinder axial direction has a thermal expansion coefficient of $-0.5 \times 10^{-6}/°C$ to $0.5 \times 10^{-6}/°C$.

2. The CFRP-made optical cylinder of claim 1, which has a thermal conductivity of 0.1 w/m·k or less in the thickness direction.

3. The CFRP-made optical cylinder of claim 1, wherein the carbon fiber uses, as the raw material fiber, a pitch fiber obtained by melt-spinning a petroleum pitch or a carbon pitch.

4. The CFRP-made optical cylinder of claim 1, wherein the carbon fiber has a fiber diameter of 15 μm or less and is used in the form of strand consisting of 2,000-3,000 fibers.

5. The CFRP-made optical cylinder of claim 1, wherein the resin used in the CFRP's is a thermosetting resin selected from the group consisting of a phenolic resin, a urea resin, a melamine resin, an unsaturated polyester resin and an epoxy resin.

6. The CFRP-made optical cylinder of claim 1, which is produced by impregnating a carbon fiber with a thermosetting resin in a given proportion, shaping the impregnated carbon fiber into a cylindrical form, and curing the cylindrical form.

7. The CFRP-made optical cylinder of claim 6, wherein said production is conducted by a method using prepreg(s), a method by filament winding or a combination thereof.

8. The CFRP-made optical cylinder of claim 7, wherein the method by filament winding comprises impregnating a carbon fiber bundle with an epoxy resin composition to prepare a strand, winding the strand round a mandrel in a plurality of layers to prepare a cylinder of given thickness on the mandrel, and heat-curing the cylinder.

9. The CFRP-made optical cylinder of claim 7, wherein the method using prepreg(s) comprises impregnating a carbon fiber bundle with an epoxy resin composition to prepare a prepreg, cutting the prepreg in an appropriate direction, winding the cut prepreg round a cylindrical mold in a plurality of layers, as necessary

TABLE 1

|  |  | Example | | Comparative Example | | |
|---|---|---|---|---|---|---|
|  |  | 1 | 2 | 1 | 2 | 3 |
|  | Material | CFRP | CFRP | Iron | Aluminum | CFRP |
|  | Volume ratio*¹ | 50/50 | 60/40 | — | — | 40/60 |
|  | Weight (kg) | 2.90 | 2.90 | 10.4 | 4.48 | 2.90 |
| Cylinder axial direction | Modulus (kg/mm²) | 9400 | 11120 | 21000 | 7000 | 7680 |
|  | Bending rigidity (kg/mm²) | 2.46E + 11 | 2.91E + 11 | 4.42E + 11 | 1.83E + 11 | 2.01E + 11 |
| Cylinder circumferential direction | Bending modulus (kg/mm²) | 15850 | 14285 | 21000 | 7000 | 16899 |
|  | Bending rigidity (kg/mm²) | 3.17E + 06 | 2.86E + 06 | 2.15E + 06 | 1.4E + 06 | 3.38E + 06 |
| Thermal properties | Thermal expansion coefficient ($\times 10^{-6}/°C$.) | 0.4 | −0.05 | 10 | 24 | 1.00 |
|  | Thermal distortion (mm) ΔT = 5° C.*² | 0.00164 | −0.000205 | 0.041 | 0.0984 | 0.0041 |
|  | Thermal conductivity (W/mk) | 0.0143 | 0.0143 | 50 | 237 | 0.0143 |
|  | Specific heat (J/gk) | 0.85 | 0.85 | 0.46 | 0.90 | 0.85 |

*¹Ratio of the volume of the CFRP having a carbon fiber direction parallel to the cylinder axial direction and the volume of the CFRP having a carbon fiber direction orthogonal to the cylinder axial direction.
*²Elongation or shrinkage (expressed in mm) in the cylinder axial direction when subjected to a temperature increase of 5° C.

What is claimed is:

1. A CFRP-made optical cylinder comprising (a) CFRP layers containing a carbon fiber arranged in a applying a tape thereon, and heating the prepreg layers under an applied pressure.

10. The CFRP-made optical cylinder of claim 7, wherein the method using prepreg(s) comprises laminating two prepregs formed by impregnating a carbon fiber bundle with an epoxy resin composition, in such a manner that the directions of the respective fibers are nearly orthogonal to each other, and then rolling the laminate into a cylindrical form so that the carbon fiber having a minus thermal expansion coefficient is substantially parallel to the axial direction of the cylinder formed by the rolling.

11. The CFRP-made optical cylinder of claim 10, wherein the volume ratio of the CFRP layers whose carbon fiber is arranged in a direction parallel to the cylinder axial direction and the CFRP layers whose carbon fiber is arranged in a direction orthogonal to the cylinder axial direction is 55/45 to 65/35.

12. The CFRP-made optical cylinder of claim 7, wherein the method using prepreg(s) comprises laminating, in a plurality of layers, prepregs whose carbon fiber is arranged in the cylinder axial direction and then laminating thereon prepreg(s) whose carbon fiber is arranged in the cylinder circumferential direction, or reversing the above procedure, or combining these procedures appropriately.

13. The CFRP-made optical cylinder of claim 12, wherein the volume ratio of the CFRP layers whose carbon fiber is arranged in a direction parallel to the cylinder axial direction and the CFRP layers whose carbon fiber is arranged in a direction orthogonal to the cylinder axial direction is 55/45 to 65/35.

14. The CFRP-made optical cylinder of claim 7, wherein the prepreg has a thickness of 0.05–0.3 mm.

15. The CFRP-made optical cylinder of claim 7, wherein the prepregs are laminated in a thickness of 1.2–2.4 mm.

16. The CFRP-made optical cylinder of claim 6, wherein the proportion (volume ratio) of the carbon fiber and the thermosetting resin is 75/25 to 50/50.

* * * * *